No. 825,350. PATENTED JULY 10, 1906.
H. RAYMOND.
MEASURED DELIVERY BOTTLE.
APPLICATION FILED JUNE 19, 1905.
5 SHEETS—SHEET 1.
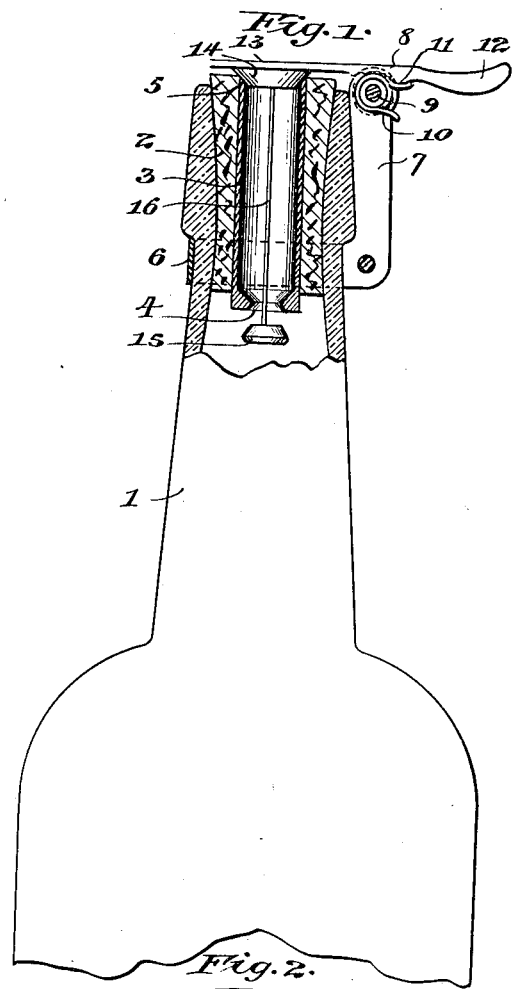
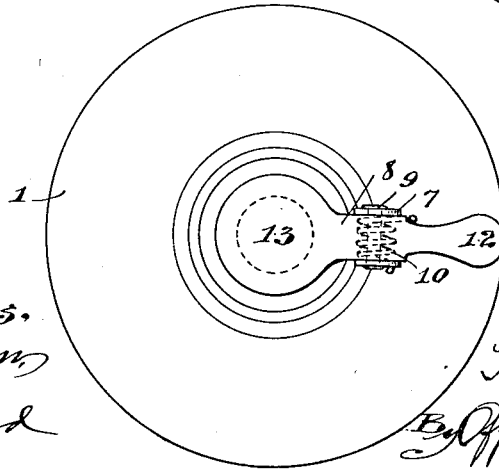
Witnesses.
S. Mann,
S. N. Pond
Inventor,
Hoyt Raymond
By Offield, Towle & Linthicum
Attys.

No. 825,350. PATENTED JULY 10, 1906.
H. RAYMOND.
MEASURED DELIVERY BOTTLE.
APPLICATION FILED JUNE 19, 1905.
5 SHEETS—SHEET 2.
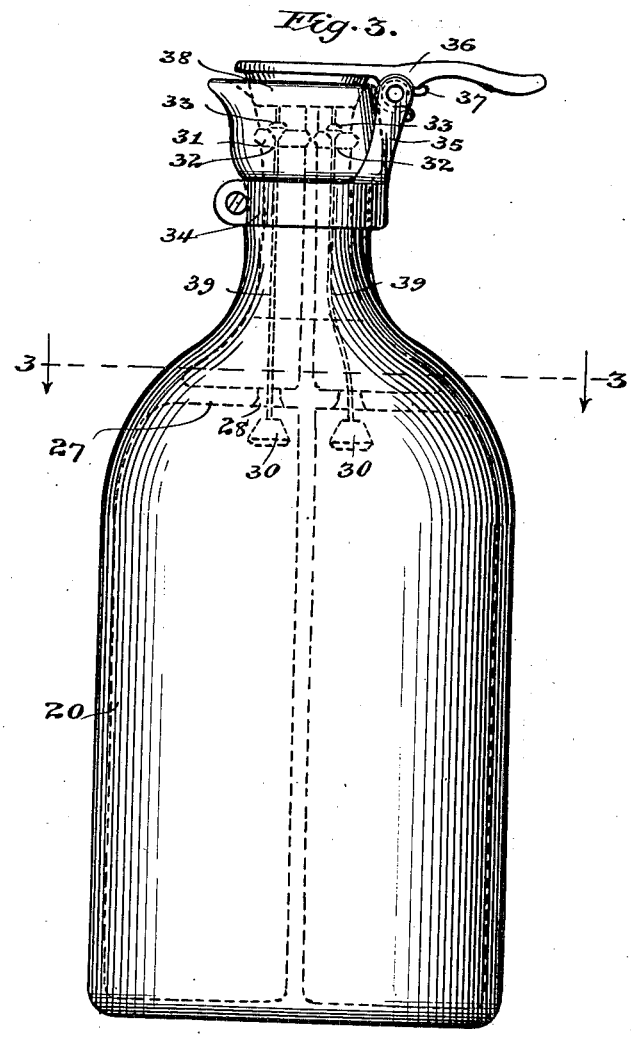
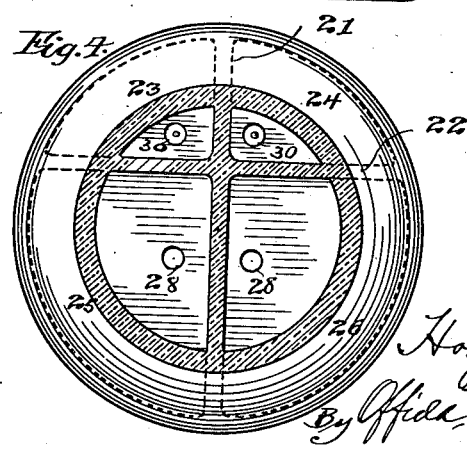
Witnesses,
Inventor,
Hoyt Raymond
By Fidd, Towle & Linthicum
Att'ys.

No. 825,350. PATENTED JULY 10, 1906.
H. RAYMOND.
MEASURED DELIVERY BOTTLE.
APPLICATION FILED JUNE 19, 1905.
5 SHEETS—SHEET 3.
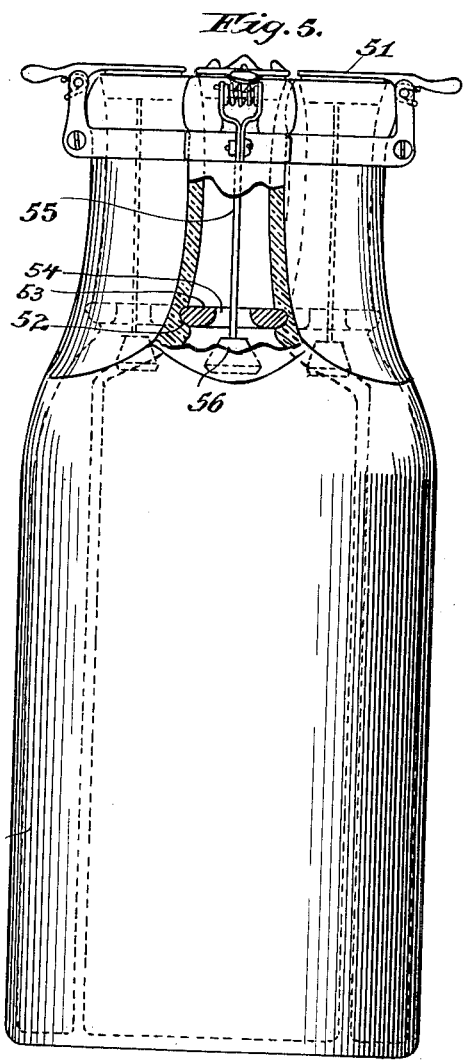
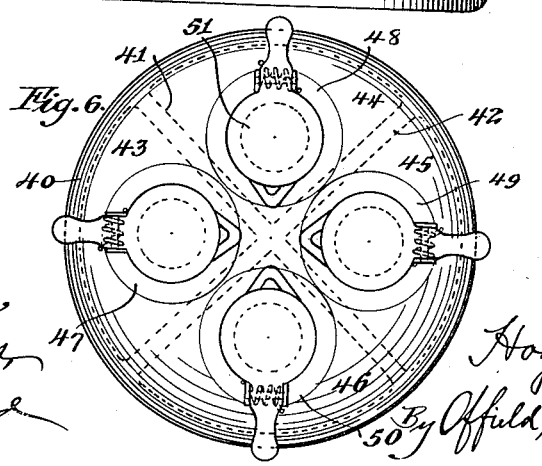
Witnesses,
Inventor,
Hoyt Raymond
By Offield, Towle & Linthicum
Attys No. 825,350.  
PATENTED JULY 10, 1906.  
H. RAYMOND.  
MEASURED DELIVERY BOTTLE.  
APPLICATION FILED JUNE 19, 1905.

5 SHEETS—SHEET 4.

Witnesses,  
Inventor,  
Hoyt Raymond  
Attys.

No. 825,350. PATENTED JULY 10, 1906.
H. RAYMOND.
MEASURED DELIVERY BOTTLE.
APPLICATION FILED JUNE 19, 1905.
5 SHEETS—SHEET 5.
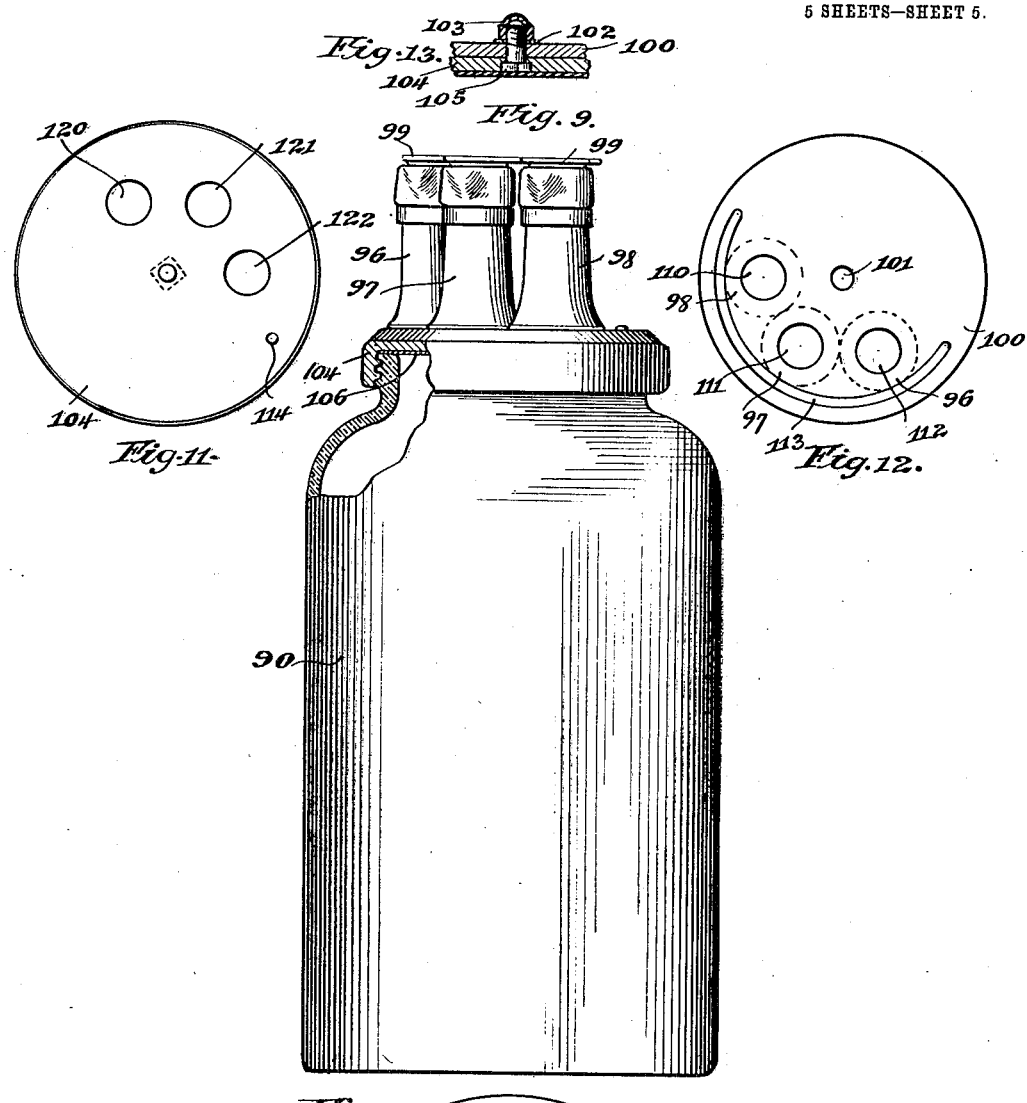
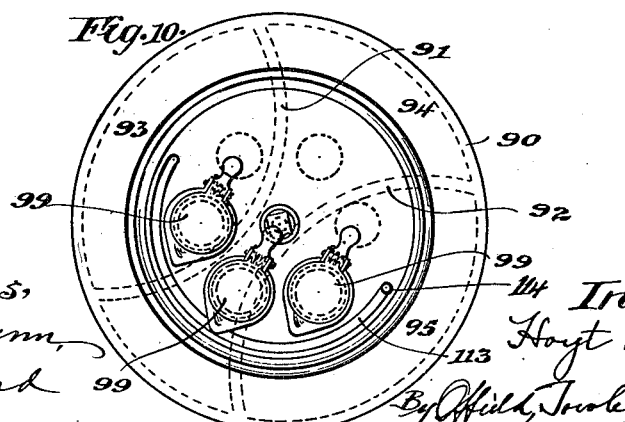
Witnesses,
Inventor,
Hoyt Raymond

UNITED STATES PATENT OFFICE.

HOYT RAYMOND, OF CHICAGO, ILLINOIS.

MEASURED-DELIVERY BOTTLE.

No. 825,350. Specification of Letters Patent. Patented July 10, 1906.

Application filed June 19, 1905. Serial No. 265,968.

*To all whom it may concern:*

Be it known that I, HOYT RAYMOND, a citizen of the United States, and a resident of Chicago, county of Cook, State of Illinois, have invented certain new and useful Improvements in Measured-Delivery Bottles, of which the following description, taken in connection with the accompanying drawings, forms a complete specification.

My invention relates to bottles provided with means for measuring the amounts of the contents which will be discharged if the bottle is inverted and the stopper opened.

My improved measuring-bottle is especially adapted for use with medicines or drinks when definite amounts of a liquid, powder, granular, or similar material are required. For use with drinks or medicines necessitating several constituents I make a multiple-compartment bottle, each compartment being provided with a measuring-chamber. Different liquids or powders are placed in the compartments, the sizes of which bear the same relation to each other and the sizes of their measuring-chambers bear the same relation to each other that the volumes of their contents do in the mixture for which the bottle is used. The measured amounts of the liquids or powders may be released from the measuring-chambers either simultaneously or successively, as appears necessary or desirable.

My invention also involves means for substantially simultaneously closing the entrance to the measuring-chamber and opening its discharge-mouth.

Figure 7:
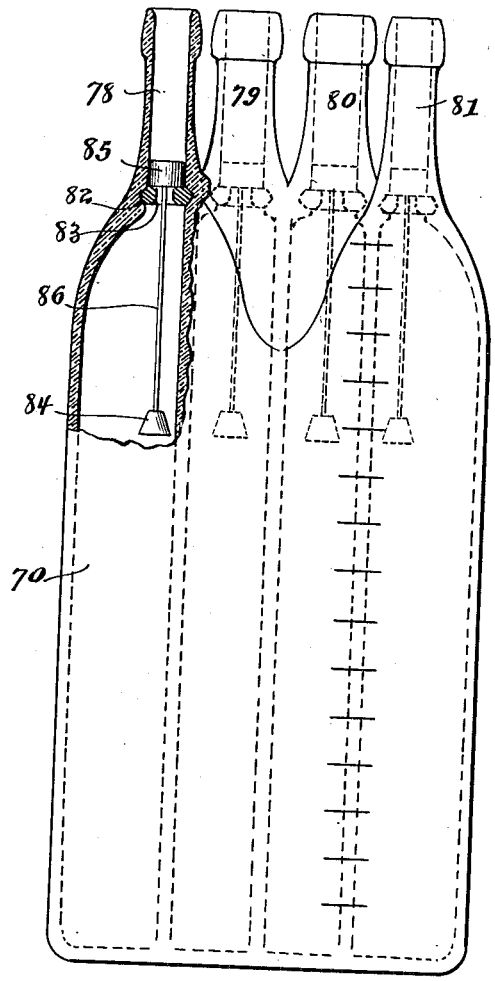
Figure 8:
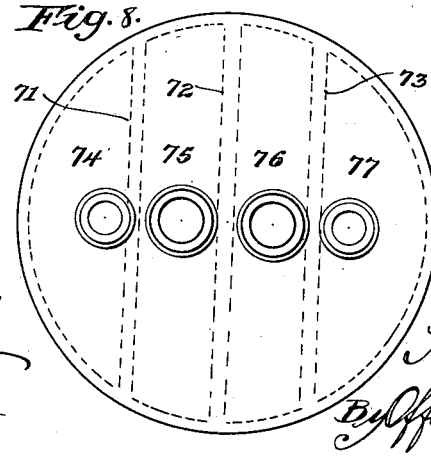

Referring to the drawings, Figure 1 represents an ordinary bottle, partly in section, provided with a measuring-chamber according to my invention. Fig. 2 is a plan view of the bottle as shown in Fig. 1. Fig. 3 is an elevation of a multiple-compartment bottle, each compartment of which is provided with a measuring-chamber, the bottle having a single neck. Fig. 4 represents a section of the bottle shown on Fig. 3 on the line 3 3 looking in the direction of the arrows. Fig. 5 represents a multiple-compartment bottle partly in section, the bottle being provided with a separate liquid-measuring neck for each compartment. Fig. 6 is a plan view of the bottle shown on Fig. 5. Fig. 7 is an elevation, partly in section, of a multiple-compartment bottle provided with means for automatically measuring and releasing definite quantities of liquids when the bottle is inverted. Fig. 8 is a plan of the bottle shown in Fig. 7. Fig. 9 represents an elevation, partly in section, of a modified form of a multiple-compartment bottle with a plurality of necks which constitute measuring-chambers, the said necks being capable of rotary movement, so as to open and close their receiving-mouths. Fig. 10 is a plan view of the bottle shown in Fig. 9. Figs. 11, 12, and 13 show details of the bottle illustrated in Figs. 9 and 10.

Referring to Fig. 1, which represents an ordinary form of bottle in the neck of which is inserted my improved measuring device, 2 represents a longitudinally-perforated cork inserted in the mouth of the bottle. Within this perforation is placed a cylindrical measuring-chamber 3, which has a tapering mouth 4 in its lower end and a tapering mouth 5 in its upper end. A band 6 encircles the neck of the bottle, the ends of the band being upturned to form lugs between which is pivoted the stopper member 8, comprising a thumb-piece 12 and a portion 13, extending over the mouth of the bottle, the latter portion being provided with a tapering plug 14, adapted to enter and close the mouth 5. This stopper 8 is pivoted on the pin 9 and is actuated by the spring 10, so as to normally close the mouth of the bottle. Extending downwardly from the stopper 8 is the rod 16, which passes through the measuring-chamber 3. Secured to the lower end of this rod 16 and below the mouth 4 is the tapering plug 15, adapted by its upward and downward movement to close and open the receiving-mouth 4 of the measuring-chamber.

When it is desired to discharge from the bottle a measured amount of the liquid, the bottle is turned bottom upward until the chamber 3 is completely filled with the contents of the bottle. To discharge the contents of the chamber into a glass or other receptacle, the operator by pressing upon the part 12 opens the discharge-mouth 5 of the chamber and simultaneously closes the receiving-mouth of the chamber by means of the movement of the rod 16 and stopper 15, attached to the arm 13 of the stopper 8. When the contents of the chamber have been released, the stopper 8 is allowed to reclose the mouth of the bottle, whereupon the receiving-mouth of the measuring-chamber is again opened.

In Fig. 3 I have shown a bottle similar to that illustrated in Fig. 1, but provided with a plurality of compartments and measuring-chambers, one for each compartment. The bottle 20 is divided into four compartments 23, 24, 25, and 26 by the intersecting longitudinal partitions 21 and 22. These chambers may be of the same or different sizes, according to the amounts of liquid they are to contain. In the mouth of the bottle four measuring-chambers are formed by the extensions of the partitions 21 and 22 in combination with the transverse partition 27. These measuring-chambers are made of a size to correspond to the size of their compartments, though such a construction is not necessary, since the chambers may be of any desired size. A band 34 encircles the neck of the bottle in the same manner as does the band described in connection with the bottle illustrated in Fig. 1. The stopper member 36 is pivoted between two lugs 35, supported by band 34, and is spring-actuated to close the mouth of the bottle, as is the stopper 8. Between each compartment and its measuring-chamber is a tapering passage 28 in the partition 27, which forms means for the liquid to pass from the compartment to its corresponding measuring-chamber. In the upper part of each chamber is a plug 31, of cork, rubber, or other suitable material, which is held in place by engaging a recess in the sides of measuring-chamber. Each plug 31 is provided with a discharging-mouth 32, with which coöperates a tapering plug 33. The two plugs 30 and 33 are secured to a rod 39, which is fastened to the lower side of the stopper 38, each measuring-chamber being provided with plugs 30 and 33 and a rod 39. When the bottle is turned bottom upward, the four measuring-chambers are filled with their corresponding liquids from the compartments, the liquids passing through the openings 28. After the measuring-chambers have been filled the contents thereof can be simultaneously released, so as to discharge into a glass or other vessel by pressing with the thumb on the stopper 36. In so doing the plug 38 is removed from the mouth of the bottle, the four discharging-mouths of the measuring-chambers are simultaneously opened, and the four receiving-mouths of the chambers are simultaneously closed. When the thumb is removed from stopper 36, the latter is thrown to its closed position and closes the mouth of the bottle, the plugs 33 close the discharge-mouths, and the plugs 30 open the receiving-mouths 28.

In some cases it is desirable that the liquids be not simultaneously mixed, but it is necessary for the proper mixture that they be successively discharged into the glass. To accomplish this result, I use the modified form of bottle illustrated in Fig. 5, wherein I have illustrated a multiple-compartment bottle with four necks, the necks constituting measuring-chambers. The bottle 40 is divided into four compartments 43, 44, 45, and 46 by the intersecting partitions 41 and 42. These compartments may be of the same or of differing size, and the necks of the bottles may be made to bear the same relation to each other as regards size as do the compartments.

I have shown the four necks 47, 48, 49, and 50 each provided with a spring-pressed stopper 51, similar to the stoppers shown in Figs. 1 and 3. In each neck is inserted a perforated member 53, engaging a recess 52 in the neck for the purpose of holding it in its proper place. This member 53 may be formed of rubber, cork, or any other suitable material. Each stopper 51 is provided with a downwardly-extending rod 55, to the lower end of which is attached a tapering plug 56, the latter coöperating with the perforation 54 in the part 53, so as to open or close the communication between the compartment and the neck which constitutes the measuring-chamber.

To operate the bottle, it is turned bottom upward, so that the liquids in the compartments fill their corresponding necks or measuring-chambers. The stoppers 51 are then opened manually in succession, so as to discharge the contents of the necks into the glass. When the stoppers 51 are thus opened, the plugs 56, through the means of the rods 55, close the openings 54, and thus shut off communication with the compartments. When the stoppers 51 are released, their springs throw them into place, so as to close the mouths of the necks and to open communication between the necks and the corresponding compartments.

In Fig. 7 I have shown a modification which operates automatically to discharge the contents of the measuring-chambers simultaneously. The bottle is divided into compartments 74, 75, 76, and 77 by means of the partitions 71, 72, and 73. Each compartment is provided with a neck, four being shown in this case and characterized by reference-numerals 78, 79, 80, and 81. The necks in this bottle, as in the one shown in Fig. 5, constitute the measuring-chambers. Within each neck is inserted a perforated plug 82, which is held in place by engaging a recess in the wall. The plunger 85 fits the interior of the neck, and the tapering plug 84 is suspended therefrom by means of a rod 86. Each neck is provided with such a plunger and tapering plug. To operate this bottle, it is turned bottom upward. The plungers 85 slide toward the mouths of the necks, the liquids from the compartments pass into the necks through the openings 83, and when the plungers pass out of the mouths of the necks the tapering plugs 84 engage openings 83, so as to close communication between the compartments and the necks. The rod 86 is made of such a length that when the plug 84 fits the recess 83 the contents of the necks can be discharged from their mouths. When the bottle is set in upright position, the plungers 85 assume the position as shown in Fig. 7.

In Fig. 9 I have shown a modification in which the necks of the bottle are manually turned so as to establish communication between the compartments and the necks, which constitute the measuring-chambers. The partitions 91 and 92 divide the bottle 90 into compartments 93, 94, and 95. A gasket 106 rests upon the neck of the bottle and also upon the top of the partitions, this gasket having three perforations to coincide with the holes 120, 121, and 122 in the clamping member 104, which by a threaded engagement with the neck of the bottle holds the gasket 106 firmly in place. Revolubly mounted upon the clamping member 104 is the flat plate 100 with the necks 96, 97, and 98 extending upwardly therefrom. This plate 100 is centrally pivoted on member 104 by means of bolt 102, whose angular head engages in recess 105 in the lower side of the part 104. The closed nut 103 engages the threaded end of bolt 102 and holds the part 100 in its proper position. The plate 100 is provided with a semicircular slot 113, which coöperates with a lug or pin 114, extending upwardly from member 104. The part 100 is provided with the openings 110, 111, and 112, which communicate with the necks of the bottle. By turning the part 100 and the integral necks 96, 97, and 98 communication may be established between the compartments of the bottle and the measuring-necks. Each neck is provided with a spring-pressed stopper 99, similar to the stoppers hereinbefore described. To close communication between the compartments and necks, the latter are turned in the opposite direction. The operation of the bottle is similar to that shown in Fig. 5 and needs no further description.

My invention is susceptible of various other modifications which will be at once apparent to any one skilled in the art.

I claim—

1. A multiple-compartment bottle, provided with a measuring-chamber for each compartment, each chamber having a receiving and a discharging mouth, and means for simultaneously closing the receiving-mouths and opening the discharging-mouths, substantially as described.

2. A multiple-compartment bottle, provided with a plurality of measuring-chambers, each chamber having a receiving-mouth, and means for simultaneously controlling said mouths, substantially as described.

3. A multiple-compartment bottle, provided with a plurality of measuring-chambers, each chamber having a discharge-mouth, and means for simultaneously controlling said mouths, substantially as described.

4. A multiple-compartment bottle, provided with a measuring-chamber for each compartment, each chamber having a receiving and a discharging mouth, means to control each mouth, a closing means for the bottle-mouth, and means connecting said closing means with the mouth-controlling means so that when the bottle-closing means is opened, all the receiving-mouths are closed and all the discharging-mouths opened, substantially as described.

5. A bottle having a plurality of compartments the sizes of which bear the same relation to one another that the volumes of their contents do in a given mixture for the production of which the bottle is employed, each compartment having a measuring-chamber, each measuring-chamber having a receiving and discharging mouth, and means to simultaneously open the discharging-mouths and close the receiving-mouths, substantially as described.

6. A bottle having a plurality of compartments the sizes of which bear the same relation to one another that the volumes of their contents do in a given mixture for the production of which the bottle is employed, each compartment having a measuring-chamber, the size of each of said measuring-chambers being a given part of the capacity of its corresponding compartment, each measuring-chamber having a receiving and discharging mouth, and means to simultaneously open the discharging-mouths and close the receiving-mouths, and vice versa, substantially as described.

7. A bottle having a single neck and a plurality of compartments the sizes of which bear the same relation to one another that the volumes of their contents do in a given mixture for the production of which the bottle is employed, each compartment having a measuring-chamber in said neck, each measuring-chamber having a receiving and discharging mouth, and means to simultaneously open the discharging-mouths and close the receiving-mouths, substantially as described.

HOYT RAYMOND.

Witnesses:
SAMUEL N. POND,
L. F. MCCREA.